United States Patent [19]
Gange

[11] 3,772,612

[45] Nov. 13, 1973

[54] LIGHT MODULATOR

[75] Inventor: Robert Allen Gange, Belle Mead, N.J.

[73] Assignee: RCA Corporation

[22] Filed: May 13, 1971

[21] Appl. No.: 143,089

[52] U.S. Cl. ................ 332/7.51, 350/161, 252/300, 307/311

[51] Int. Cl. ................ H01s 3/12

[58] Field of Search ................ 332/7.51; 350/160, 350/161; 117/33.3; 331/94.5 A; 307/311; 252/300

[56] References Cited

UNITED STATES PATENTS

| | | | |
|---|---|---|---|
| 3,521,941 | 7/1970 | Deb et al. | 350/160 R |
| 3,462,712 | 8/1969 | Boddy et al. | 332/7.51 |
| 3,656,836 | 4/1972 | Cremour et al. | 332/7.51 |

OTHER PUBLICATIONS

Beam, "Charge-Storage Beam Addressable Memory," 10/66, pg. 555-556, IBM Tech. Disc. Bull., Vol. 9, No. 5.

Peters, "I-F Modulator Using . . . and Induced Conductor," 8/65, pg. 1148-1149, Proceedings of the IBBE Simmons, "Effect of Deep Trgrs. . . . MIM Tunnel Functions," 8/11/69, pg. 297-300, P.R.L., Vol. 23, No. 6.

Simmons, "Generalized Formula . . . Thin Insulating Film," 6/63, pg. 1793-1803, J.A.P., Vol. 34, No. 6.

Simmons et al., "New Conduction . . . in Thin I. Films," 1967, Proceedings of the Royal Society, pg. 77-102, A-301.

*Primary Examiner*—Benjamin A. Borchelt
*Assistant Examiner*—N. Moskowitz
*Attorney*—H. Christoffersen, Glenn H. Bruestle and Irwin M. Krittman

[57] ABSTRACT

A metal-insulator-metal device formed of materials such as gold, polystyrene and aluminum. In response to the application to the device of a forward voltage for a relatively long time interval, gold ions and electrons migrate from the gold and aluminum regions respectively and become trapped in the polystyrene. Upon removal of the voltage, the device acts as a light attenuator in a given light frequency range. The device may be switched to a second condition in which it is relatively transparent to light by applying thereto a relatively shorter duration, lower amplitude voltage pulse and also can be switched back to its light attenuating condition.

3 Claims, 15 Drawing Figures

INVENTOR.
Robert A. Gange
BY Samuel Cohen
ATTORNEY

INVENTOR.
Robert A. Gange
BY
ATTORNEY

INVENTOR.
Robert A. Gange
BY [signature]
ATTORNEY

INVENTOR.
Robert A. Gange
BY
ATTORNEY

INVENTOR.
Robert A. Gange
BY Samuel Cohen
ATTORNEY

INVENTOR.
Robert A. Gange
BY Samuel Cohen
ATTORNEY

LIGHT MODULATOR

SUMMARY OF THE INVENTION

An induced energy band is created in the forbidden energy gap of an insulating layer by trapping in the layer a plasma consisting of positive metal ions and electrons. In this condition, the insulating layer attenuates light in a given frequency range. An electron space charge may be introduced and trapped in the insulating layer to switch it from its light attenuating to a light transmitting condition. The insulator may be switched back to its light attenuating condition by removing the electron space charge.

DETAILED DESCRIPTION

Figure 11:
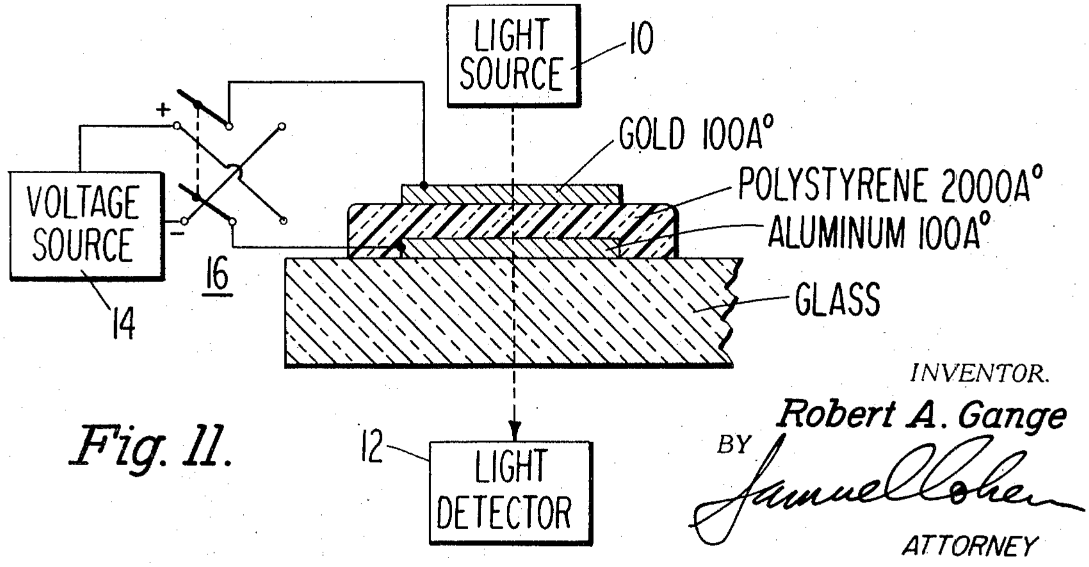
FIG. 11 is a cross section through a device according to an embodiment of the invention.

FIG. 11 illustrates the structure of a single device in accordance with an embodiment of the invention. It includes a very thin layer of aluminum which may be of the order of 100 Angstroms (A.) thick on a substrate formed of a transparent material such as glass. The aluminum is covered with a hard, amorphous "sponge-like" insulator material such as polystyrene which may be of the order of 2,000 A. thick. A relatively thin layer of a second metal which has a considerably different oxidation potential than the first metal, is located on the polystyrene layer. A suitable metal has been found to be gold and the layer thickness also may be of the order of 100 A. Both metals are transparent at these thicknesses. A more detailed discussion of how the device may be fabricated is given later.

After fabrication, a forward voltage (relatively positive at the gold anode and relatively negative at the aluminum cathode) such as one greater than about +5 volts is applied between the gold and aluminum layers for a relatively long interval of time — an interval of perhaps 5 to 10 seconds. The apparatus for doing this may include a voltage source 14 and a switch 16 which is thrown to a position such that a relatively positive voltage appears at the gold electrode. In response to this forward voltage, it is thought that a plasma is formed in the polystyrene layer and becomes trapped there. It has been found that gold ions migrate from the gold anode and a corresponding number of electrons migrate from the cathode in response to the relatively positive voltage applied to the gold, and both the gold ions and the electrons become trapped in the polystyrene.

After the sample has been treated in this way, it is found that when light from source 10 is shined through the device to a light detector 12, a certain portion of this light, in a given frequency range, is attenuated. In particular, light having a wavelength of 6,150 A. (corresponding to the color red in the visible spectrum) or less is attenuated by about 30 percent. This attenuation is believed due to photoexcitation of electrons from the insulator valence band into the induced band of states.

Photons incident on the device from light source 10 of FIG. 11 are believed also to photoexcite electrons from the induced band to the conduction band of the insulator. Two mechanisms are thought responsible for the electron population within the induced band. The first mechanism is electron photoexcitation from the valence band (mentioned above); the second mechanism is electron diffusion into the plasma from the Fermi level of the cathode via tunnelling between the adjacent metallic ions of the plasma. Electron diffusion is thought to be the major source of the space charge, and the amount of energy between the cathode Fermi level and the bottom of the conduction band is therefore a measure of the frequency of incident light, below which the attenuation will be substantially reduced.

If after the device of FIG. 11 has been treated in the way described above, a relatively short pulse in the forward direction (FIG. 13*b*) is applied to the device, the device again becomes transmitting. The shape of the pulse is not critical. The pulse duration $\tau_d$, that is, the region of the pulse at about 8 volts amplitude, must be at least 10 nanoseconds, but may be greater. The trailing edge "$\tau_e$" must not exceed about 100ns, but may be shorter. In practice $\tau_d$, so long as it is greater than 10ns is not critical and pulses as long as several hundred ns may be used. Similarly, in practice, the pulse is turned off as quickly as possibly and so long as the turn-off time is less than 100ns, the desired operation is achieved. The leading edge shape and duration are not critical. The pulse amplitude should be substantially greater than 5 volts — good results having been obtained with a pulse of about 8 volts amplitude.

As will be explained in more detail below, it is believed that in response to the voltage pulse of FIG. 13*b*, electrons are swept from the aluminum cathode into the top of the induced band of the polystyrene. After the trailing portion of the pulse, these electrons diffuse along the top of the induced band and permanently alter the Fermi level in the interior of the insulator (the effect can be electronically reversed as is discussed in greater detail later). However, the removal of voltage is sufficiently sudden that the electrons become trapped as an additional space charge along the top of the induced band within the polystyrene. Light incident on the device in this condition is of insufficient energy to photo excite the electrons into the conduction band and the light is transmitted through the device.

Figure 13:
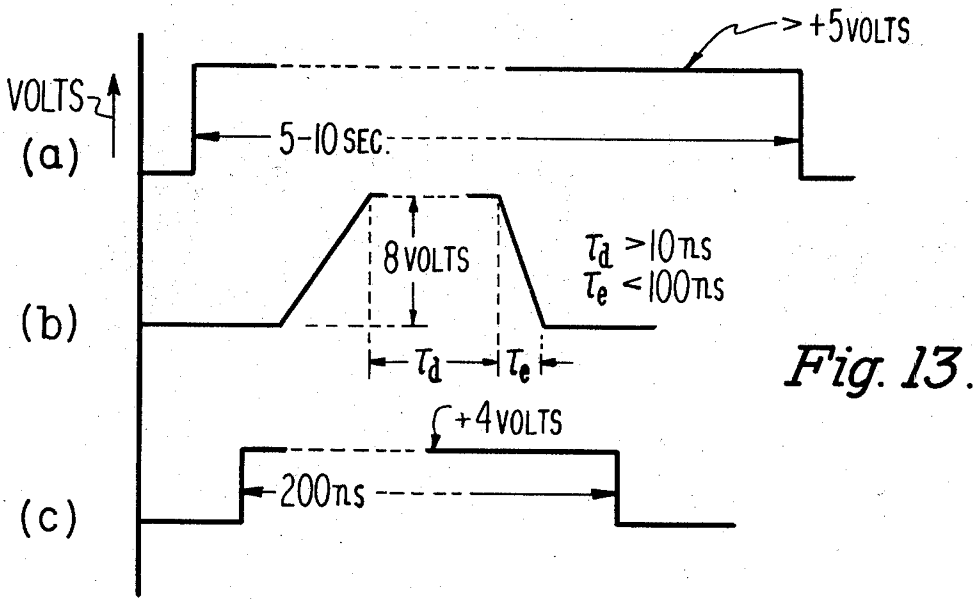
FIG. 13 is a drawing of waveforms employed in the operation of the embodiments illustrated in FIGS. 11 and 12.

The device of FIG. 11 may be returned to the light absorbing condition by applying a forward pulse thereto such as shown in FIG. 13*c*. This pulse is of relatively longer duration, say 200 nanoseconds or so, and of relatively lower amplitude, for example, 4 volts. The pulse amplitude should correspond approximately to the voltage at the current peak of the characteristic of FIG. 4, as discussed shortly. In response to this voltage pulse, electrons flow relatively freely from the aluminum cathode through the polystyrene to the gold anode thereby removing the trapped space charge within the polystyrene. For reasons to be discussed shortly, upon removal of the pulse of FIG. 13*c*, the device of FIG. 11 is found again to act as a light absorber.

The fabrication of the device of FIG. 11 may be carried out in the following way. The aluminum layer may be vacuum deposited on the glass through a mask. After deposition, the aluminum film is placed in an oxygen atmosphere of $10^{-3}$ torr for about 30 minutes to anodize the film (to cause a protective film of aluminum oxide to form over the surface of the aluminum). The purpose of anodizing is to provide some immunity to air borne impurities, water vapor, etc. when the sample later is removed from the vacuum system employed to lay down the metal to the vacuum system for the deposition of the polystyrene layer over the aluminum.

After the step above, a layer of a hard amorphous sponge-like material which contains many structural holes, defects and traps, and which is an insulator, is layed down over the aluminum. As already mentioned, polystyrene has been found to be a suitable material. The thickness mentioned previously is 2,000 A.; however, in practice thicknesses of between 1,000 to 3,000 A. have been found to provide satisfactory results. The polystyrene is layed down by bleeding polystyrene vapor into a vacuum system in which the aluminum on its substrate is located. During this deposition, a uniform electric field is continuously applied to the aluminum by a second circular electrode spaced over and about 1 inch from the aluminum surface. A voltage of several hundred volts may be employed to create a strong electric field normal to the aluminum surface. This voltage is left on during the entire deposition procedure which takes about 20 minutes. The continuous electric field present during the deposition causes polymerization and cross linking of the internal molecular structure of the polystyrene to occur. This geometrically complex insulator structure captures and stores the plasma, as discussed below.

After the polystyrene layer is in place a thin layer of gold is vacuum evaporated through a mask onto the polystyrene.

After the device has been fabricated in the manner discussed above, it is placed in a modest vacuum of about 1 micron and thereafter is maintained in this vacuum. The purpose of the vacuum is to remove absorbed and adsorbed oxygen from the device. The oxygen, if present, adversely affects the device operation. It is believed to introduce surface states, to diffuse into the structural defects on the insulating film, and to establish internal screening potentials which impede anode ion injection into the polystyrene insulation layer. As an alternative to operating the device in a vacuum, it may be placed instead in an inert gas environment such as one formed of nitrogen or helium.

With the device of FIG. 11 in a suitable environment as described above, a forward bias potential (relatively positive at the gold anode and relatively negative at the aluminum cathode) of about 5 volts is applied to the device for an interval of 5 to 10 seconds to cause gold ions to be injected from the gold layer into the amorphous, sponge-type polystyrene insulator. During this injection process, for each positive gold ion injected by the anode, the cathode injects an electron, thereby preserving charge neutrality within the polystyrene insulator.

Upon removal of the voltage, the anode ions which lie above the Fermi level of the insulator and the cathode electrons which lie below the Fermi level of the insulator, together resemble a solid solution or congealed plasma with electrostatic interaction between its electrons and ions. Since the ions are randomly imbedded within the amorphous medium, there is no "next neighbor" or "next nearest neighbor" configuration. The ionic potential is therefore ill defined. Since the electrons occupy traps within the insulator whose distance to any one ion is random, the overall effect is a randomly perturbed, ill defined potential which produces otherwise excluded localized states within the forbidden energy gap of the insulator. This induced band is believed to be rather broad, of the order of one electron volt (ev) or more, and is believed to lie about 1.5 ev below the insulator conduction band and about 2.0 ev above the insulator valence band.

Figure 1:
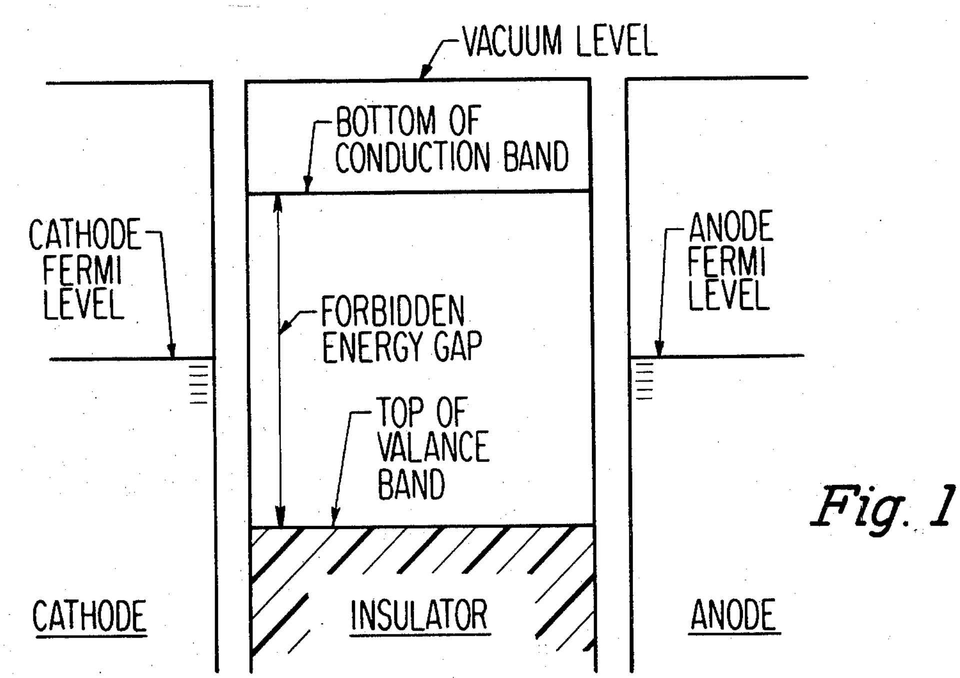
FIGS. 1, 2, 3, 5, 6, 7, 8*a*, 8*b*, 9, 10*a* and 10*b* are energy state drawings to help explain the operation of the light modulator of the invention.
Figure 2:
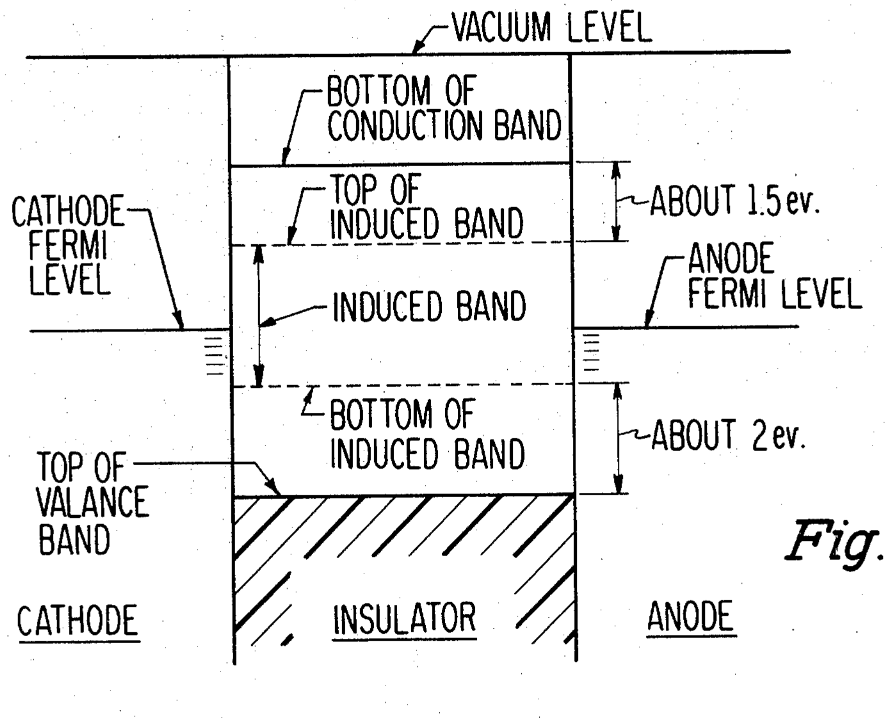

FIG. 1 illustrates the insulator band structure prior to the time that the plasma described above has been injected into the insulator. FIG. 2 illustrates the band structure of the polystyrene after the plasma has been injected. For simplicity, interfacial band bending is not shown in these figures.

If, after the plasma has been injected in the manner described above, light is applied to the device, certain absorption effects are observed. For appropriate wavelengths, there is a decrease in light transmission (about 30 percent for 6,150 A. and lower). This light absorption effect at 6,150 A. is believed to be due to optical electron excitation from the insulator valence band into the energy states of the induced band.

Figure 3:
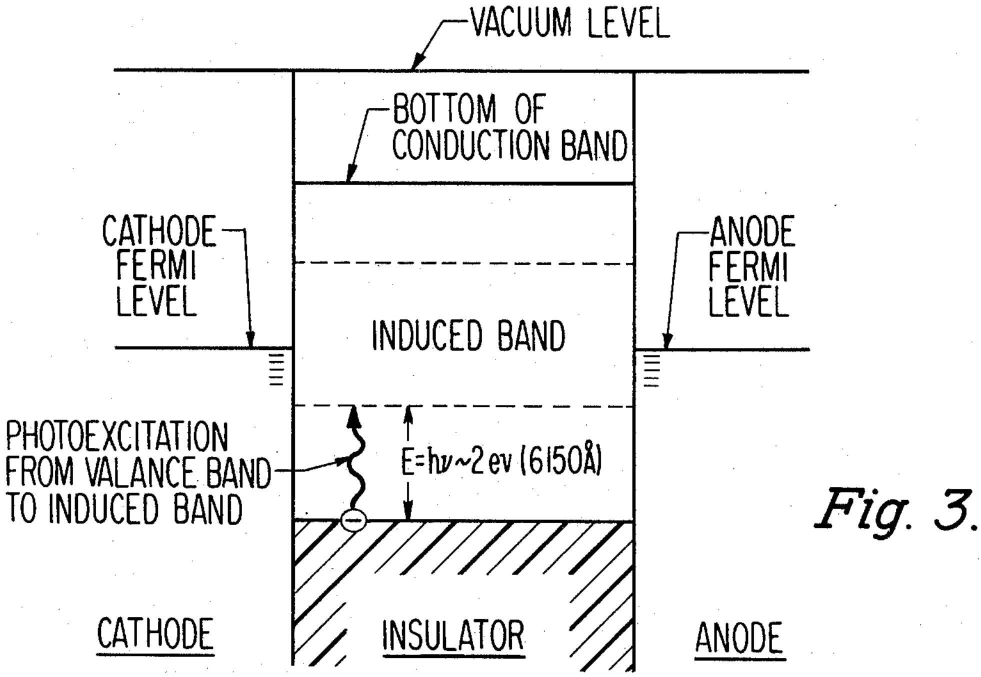

The 6,150 A. wavelength is believed to correspond to the energy difference between the top of the valence band and the bottom of the induced "plasma" band. At wavelengths longer than this, even with the plasma in the polystyrene as described above, insufficient photon energy exists optically to excite valence electrons into the induced band and no significant absorption of light takes place. The valence band optical excitation phenomenon is illustrated in FIG. 3.

The plasma as discussed above can be removed from the polystyrene by applying a reverse bias voltage of say −5 to −10 volts for a relatively long interval of time — say 5 to 10 seconds. This is accomplished in FIG. 11 by throwing the switch 16 to the proper position and placing the voltage source 14 at the proper level. If the sample is treated in this way, the induced band is removed and in the absence of this induced band, the incident photon energy (the incident light) is inadequate to excite valence electrons over the relatively large insulator energy gap into the conduction band (even at the lower optical wavelengths — those well below 6,150 A.) and light absorption does not occur.

Figure 4:
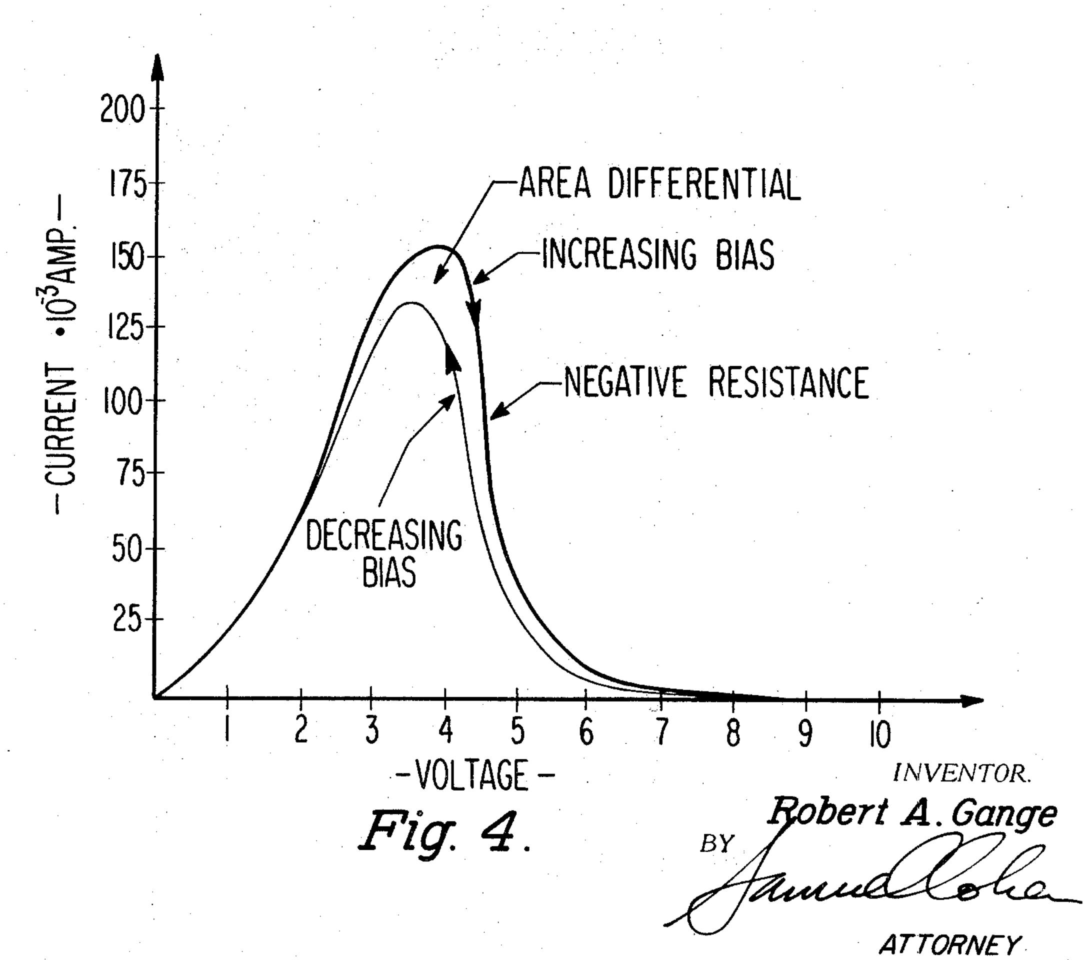
FIG. 4 is a characteristic curve of current versus voltage for a device according to an embodiment of the invention.

Returning now to the condition of the device after the plasma has been injected, it already has been mentioned that the plasma remains stored in the device in the structural defects of the polystyrene insulating layer. In this condition, if an increasing and decreasing forward voltage (a triangular sweep voltage) is applied between the anode and cathode, a current voltage characteristic is observed as shown in FIG. 4. The device is seen to exhibit a negative resistance at voltages greater than 4 volts, that is, at voltages greater than the voltage at which the current peak occurs.

The value of the peak current shown in FIG. 4 is of the order of 150 milliamperes (ma.). This value can vary either way by as much as an order of magnitude, depending upon the thickness of the insulating layer, the magnitude of the ion injection, the quality of the vacuum environment, and other parameters. However, the magnitude of the voltage at which the peak current occurs has been found to be independent of the insulator thickness, thereby indicating that the effect illustrated in FIG. 4 is not electric field dependent. If the effect were field dependent, it would be expected that as the insulating layer thickness increased, the amount of voltage required to cause the device to exhibit a current peak would have to increase. Since the current peak is independent of layer thickness, it is clear that electric field is not involved. In this respect, the present device is believed to be completely different than all other known light modulators.

Figure 5:
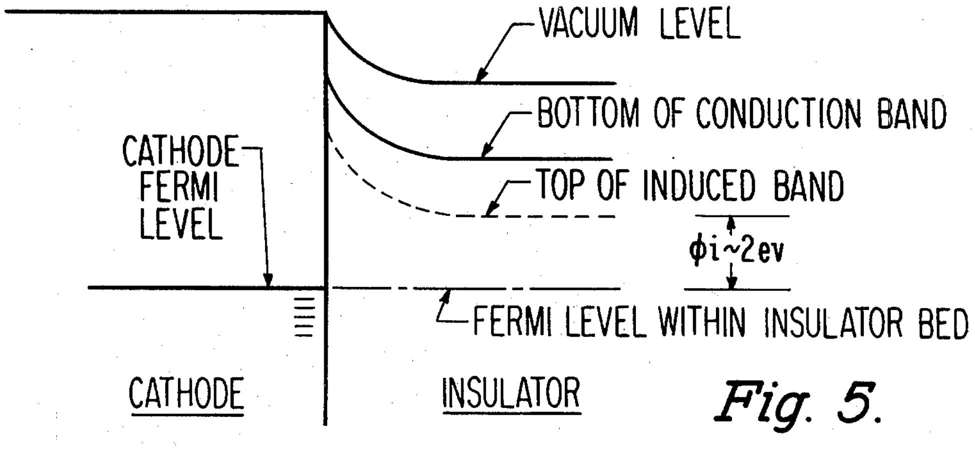

The behavior above as well as other data indicates that the plasma trapped in the insulating layer is free of electric field and this means that the applied voltage is impressed across the depletion barriers present at the insulator cathode and anode interfaces. The absence of electric field within the plasma means that substantially no power dissipation occurs within the insulator interior. This is because the current flow of FIG. 4 occurs via non-phonon assisted tunnelling between adjacent metallic ions as discussed in later paragraphs. The depletion layer, omitted from FIGS. 1–3 for reasons of clarity, is illustrated near the cathode in FIG. 5. The voltage at which peak current occurs is called the threshold voltage of the device and corresponds to the energy of the top of the induced band, referenced to the Fermi level in the insulating layer under zero bias, and in the absence of trapped charge. Since this threshold voltage is of the order of 4 volts and since half of the applied voltage is impressed across the cathode and interfacial depletion layers, the energy at the top of the induced band is believed to be of the order of 2 ev, as illustrated in FIG. 5. The power dissipation during current flow (FIG. 4) thus occurs across the electrode-insulator depletion barriers.

Quantitative analyses have been made of the polystyrene insulator after the gold ion — electron plasma has been injected therein. The amount of gold physically present in the insulator has been found to be of the order of $10^{20}$ – $10^{21}$ atoms per cubic centimeter. Analyses of similar devices in which ions were not injected, showed insignificant numbers of anode atoms present in the insulator. The high anode atomic densities indicate the average ion separation to be about 25 A°. These ion sites therefore are believed to provide the means by which, under an externally applied voltage bias, cathode electrons at the Fermi level "hop" from ion-to-ion toward the anode. Since the conductivity is temperature independent, the tunnelling process is non-phonon assisted and occurs through the induced band of energy states at the Fermi level of the cathode. At or below the device threshold voltage, the current density $j_f$ due to electrons from the cathode Fermi level can be shown to be given by:

$$j_f = 2\omega\eta \exp\{-\Omega V_o\} \quad \sinh\{(\Omega\Delta/4\delta)\ (V/V_o)\}$$

where: $\eta$ is the mean percentage of time of occupancy between local potential barriers of mean height $V_o$, thickness $\Omega$, and separation $\Delta$; the depletion layer width is $\delta$, and consists of local potential barriers which confine electrons whose frequency of oscillation is $\omega$; the externally applied voltage is $2V$.

If it is assumed that at voltage biases in excess of threshold, cathode electrons whose energies are at or below the Fermi level by an amount $v-\Phi_i$ upon entering the plasma become trapped along the top of the induced band, then only electrons which lie in energy levels lower than $v-\Phi_i$ below the Fermi level may contribute to the transport current. Therefore with voltage biases in excess of threshold, the current density is approximated by replacing $V_o$ by $V_o + V - \Phi_t$. The result is $$j_f=2\omega\eta \exp\{-\Omega(V_0+V-\Phi_i)^{1/2}\} \sin h\left\{\frac{\Phi\Delta V}{4\delta(V_0+V-\Phi_i)^{1/2}}\right\}$$

Figure 6:
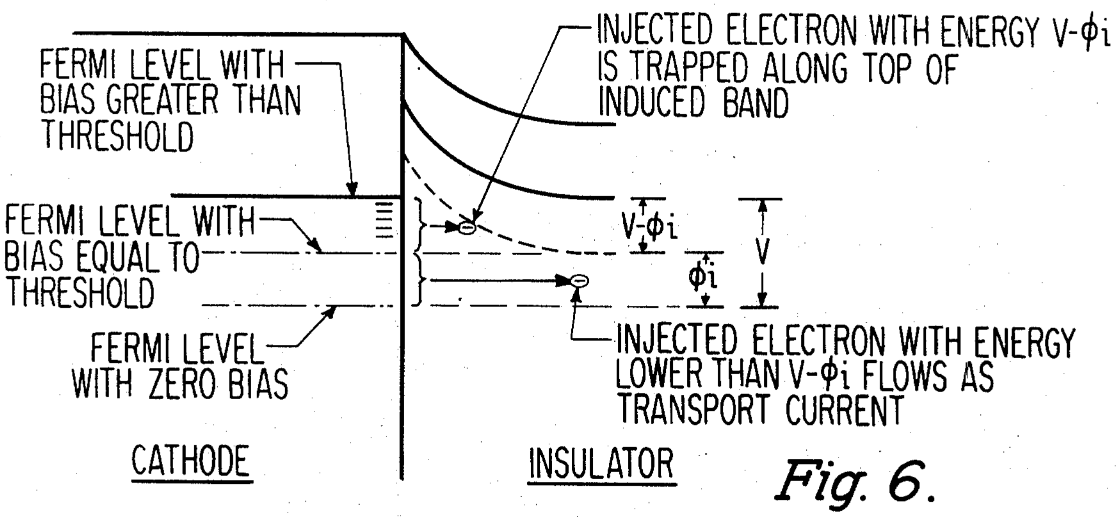

FIG. 6 illustrates the situation in which the external bias exceeds the threshold potential of the device. Whereas the first equation (external bias less than threshold) indicates an increase in current density $j_f$ with an increase in $V$, the presence of $V$ in the exponential factor of the second equation (external bias greater than threshold) indicates a decrease in current density $j_f$ with further increases in $V$. This model therefore predicts the negative resistance region of FIG. 4.

When the external bias exceeds the threshold potential of the device, electrons which derive from the energy region $v-\Phi_i$ below the cathode Fermi level (FIG. 6) are unable to travel through the induced band and onto the anode. These electrons become momentarily trapped near the cathode-insulator interface along the top of the induced band of states. The number of electrons so affected increases with the magnitude of bias $V$ above $\Phi_t$. If this external bias is removed slowly, these electrons diffuse from the cathode toward the anode along the top of the induced band following the applied voltage to zero. However, if this external bias is abruptly removed as in FIG. 13*b*, these electrons after diffusing toward the center of the insulator are indefinitely retained.

The reason for the retention is that although the electrons are able to slide down the potential hill at the cathode-insulator interface, they are unable to climb the similar potential hill at the anode-insulator interface due to the absence of applied forward voltage. Since the density of states near the top of the induced band is low, tunnelling sites of equal energy are further apart. Therefore, sites which are close together have a high probability of differing in energy by more than $k$T (Boltzmann's constant and temperature absolute). The transport of trapped charge from the cathode toward the center of the insulator is therefore phonon-assisted since energy exchanges of the order of $k$T or more are involved. This is not true of the non-phonon assisted flow of transport current between adjacent ions where the density of states is high near the middle of the induced band.

Figure 7:
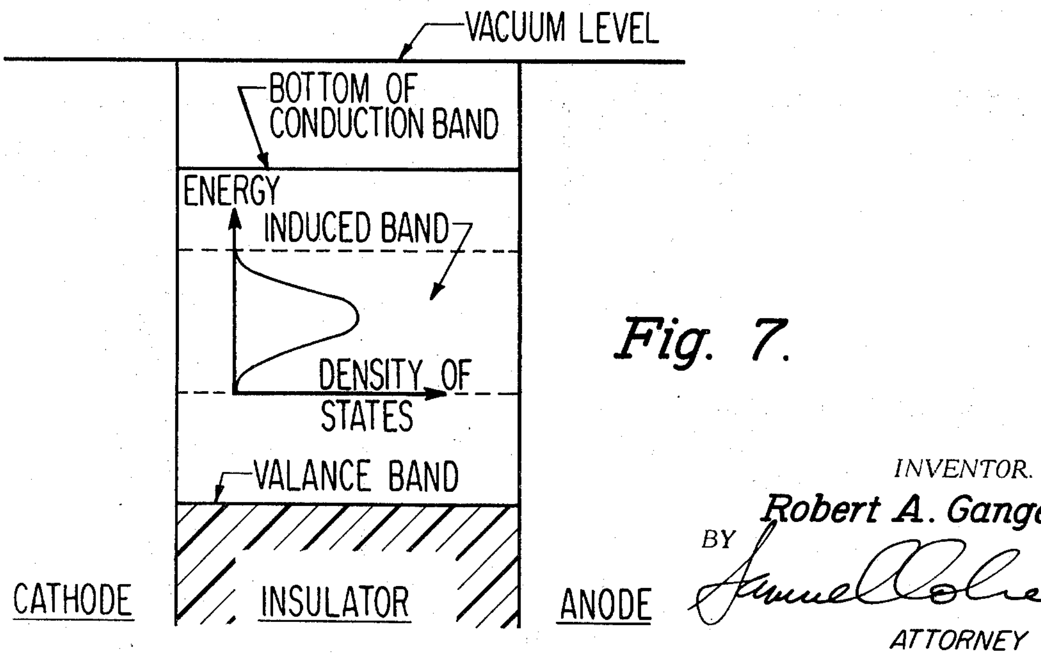
Figure 8A:
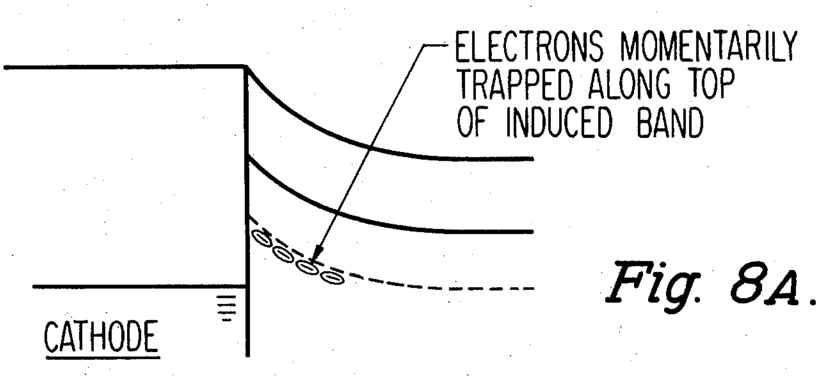
Figure 8B:
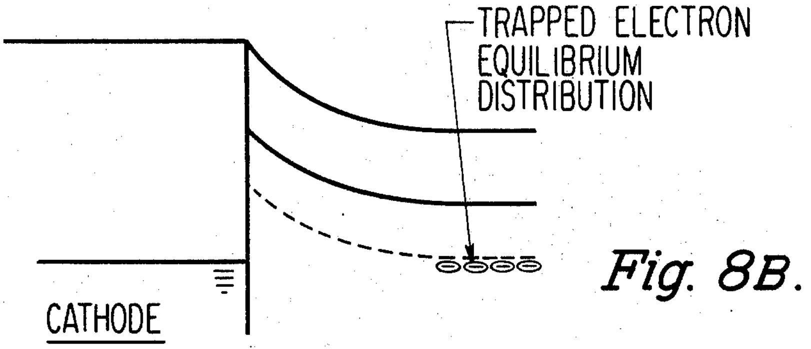

FIG. 7 shows the profile of the density of states versus energy and FIGS. 8A and 8B illustrate, respectively, the distribution of the trapped charge immediately upon the abrupt removal of the external bias (FIG. 8A), and a short time thereafter (FIG. 8B). Once having reached the center of the insulator, as shown in FIG. 8B, each trapped electron oscillates between the two most probable localized states which it occupies, thereby avoiding transitions which involve higher energy exchange. The device therefore "remembers" the magnitude of the external bias above threshold just prior to its abrupt removal since the greater the voltage, the greater is the number of electrons (at energy $V-\phi_i$) trapped in the insulator. The effect of this stored charge is to reduce the internal electric field at the cathode-insulator interface, and therefore to increase the electrical impedance of the device.

The presence of trapped charge near the center of the polystyrene insulator layer as shown in FIG. 8B serves to increase the Fermi level in that region, and therefore to increase the energy of the bottom of the conduction band referred to the Fermi level at the cathode. Since the dominant attenuation appears to be electron photo excitation from the space charge within the induced band at the cathode Fermi level, this energy defines the absorption edge i.e., the minimum incident photon frequency, below which absorption into the conduction band cannot occur (in terms of light wavelength, it defines the maximum wavelength at which light absorption occurs).

Figure 9:
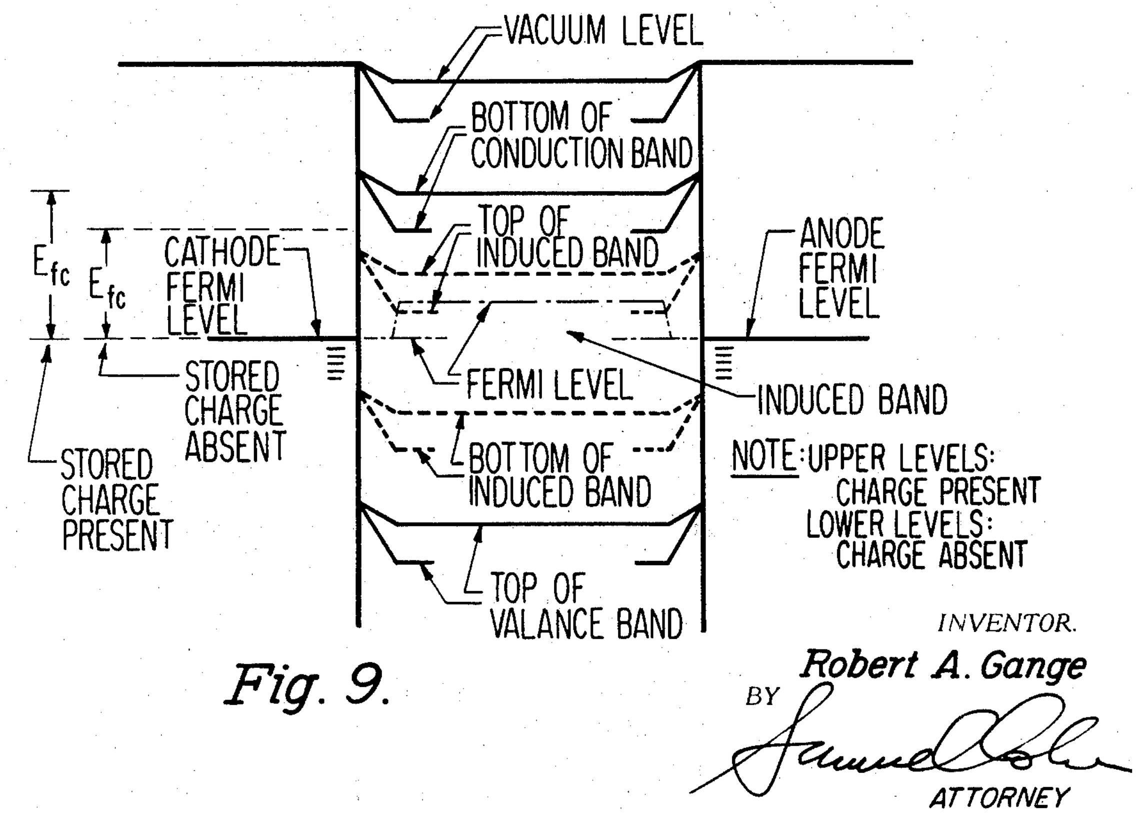

FIG. 9 illustrates the change in energy of the bottom of the conduction band, referred to the cathode, which occurs in response to the presence of trapped charge within the plasma. Included in FIG. 9 are vacuum, conduction, induced, Fermi and valence levels within the congealed plasma. The upper levels are drawn continuous through the plasma, and correspond to the band structure for which charge is trapped within the plasma. The lower levels are drawn discontinuous, extending in toward the center of the insulator bed from either interface, and correspond to the band structure in the absence of trapped charge. Of particular importance is the energy of the bottom of the conduction band referred to the Fermi level at the cathode. It is seen that this energy difference "$E_{fc}$" increases with increasing magnitude of trapped charge.

When an external bias is applied to the device of FIG. 11 after the plasma is present, non-phonon assisted transport current (that is, current flow which is substantially temperature independent) flows through the induced band from the cathode to the anode, exhibiting a current-voltage relationship of the kind illustrated in FIG. 4. The region labelled "area differential" in this figure increases with increasing rate of removal of the external bias, the magnitude of peak current for decreasing bias decreasing with more abrupt bias removal. This area between the two curves is a measure of the energy stored in the device, and increases with increasing magnitude of stored charge. Some of this energy is dissipated in the form of heat during the phonon-assisted transport of the charge down the potential hill near the cathode-insulator interface, while the remaining energy is retained in the form of potential energy in the plasma, the stored electrons now residing at the top of the induced band corresponding to an increase $\Phi_i$ over their former occupancy at the cathode Fermi level prior to application of the external bias.

Both prior to and during the non-phonon assisted transport of electrons to the anode (FIG. 4), a space charge exists in equilibrium along the induced band at an energy about equal to the Fermi level of the cathode. Incident photons with energy equal to or greater than $E_{fc}$, photo excite electrons from the space charge and into the conduction band. In the absence of stored charge, obtained by applying a pulse to the device as shown in FIG. 13*c*, if a frequency of incident photons is chosen which corresponds to an energy equal to or somewhat greater than $E_{fc}$, photoexcitation of space charge electrons into the conduction band occurs, and the incident light is attenuated. During application of the external bias of FIG. 13*c* to place the device in this light attenuating condition, the conduction process appears to be accompanied by hole tunnelling from the anode and into the valence band of the insulator. Thus, although the total net charge in the region between the cathode and anode is small, the space charge density, and therefore the number of electrons available for photon absorption, is high.

Figure 10A:
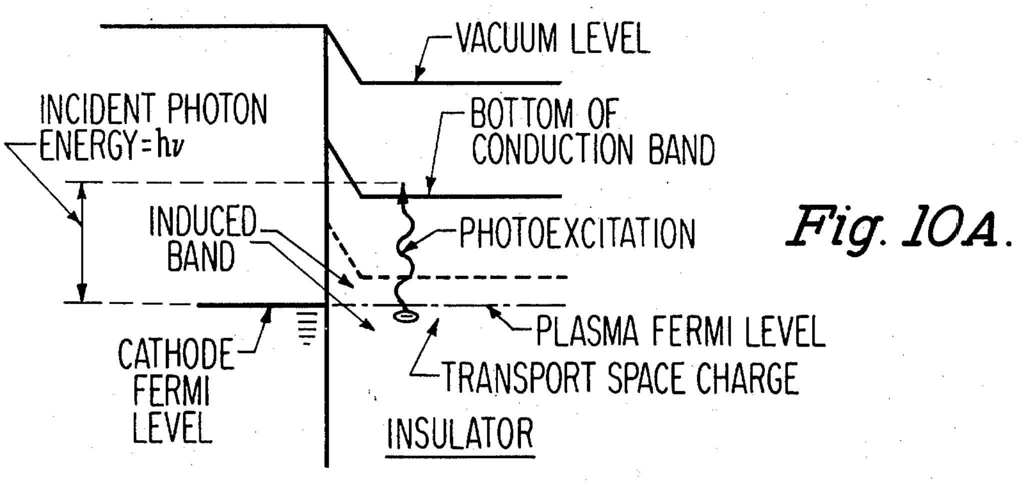
Figure 10B:
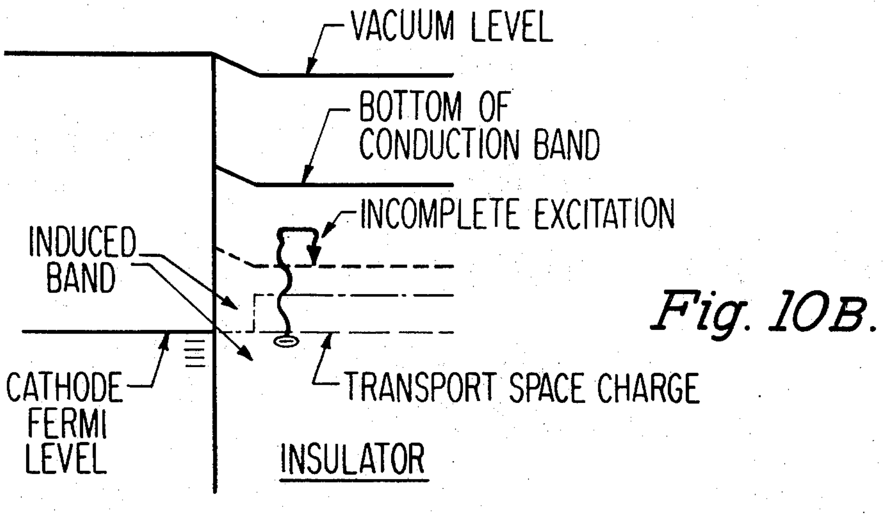

In the presence of stored charge, obtained by applying and then abruptly removing a bias of about 8 volts (a bias such as shown in FIG. 13*b* which is reasonably higher than the threshold level), the energy of the bottom of the conduction band $E_{fc}$ referred to the cathode Fermi level is increased. Since the space charge is in equilibrium with the cathode Fermi level, its energy is unchanged and the incident photon energy is insufficient to photo excite the space charge electrons into the conduction band. Thus, the incident photons are not attenuated and are transmitted through the device. The absorption process is illustrated in FIG. 10A in which stored charge is absent, and the transmission process is illustrated in FIG. 10B in which stored charge is present.

A plurality of devices such as illustrated in FIG. 11 may be arranged in an array to form a so-called "page composer" for an optical memory. The purpose of this composer is to translate a beam or several beams of light into an array of light and dark areas representing the binary digits 1 and 0 respectively.

Figure 12:
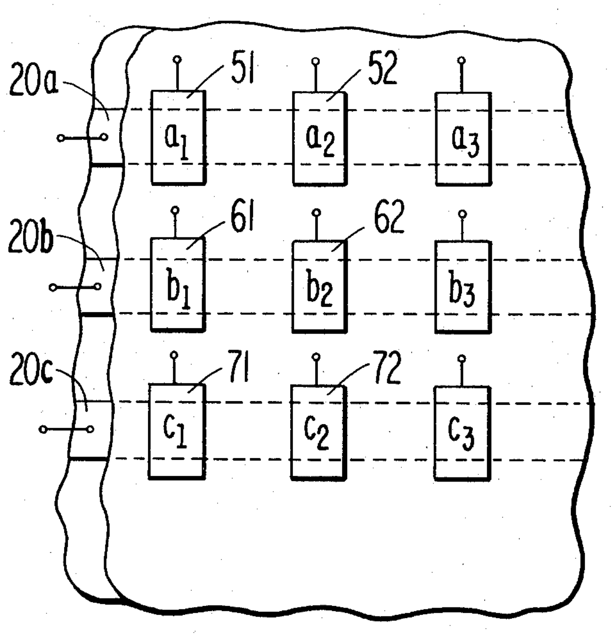
FIG. 12 is a plan view of an embodiment of a page composer according to the invention.

Three-by-three locations of a page composer are illustrated in FIG. 12. The elements 20*a*, 20*b* and 20*c* are aluminum strips on a glass substrate. They are covered with an insulator such as polystyrene. At spaced regions over the aluminum layers are located an array of gold electrodes 51, 52, 61, 62 and so on. The thicknesses of the various layers are of the same order as those already discussed. The fabrication process is also similar to that discussed. After fabrication, the devices are placed in a suitable environment and a forward bias voltage is employed as already discussed for forming the plasma within the polystyrene insulator.

To prepare the device to selectively absorb light, the locations it is desired to act as transmitters are pulsed in the manner shown in FIG. 13*b*. For example, if the pulse of FIG. 13*b* is applied to the gold anodes at memory locations $a_1$, $a_2$ and $c_2$ while all cathodes 20 are at ground, these locations are placed in the light transmitting state and all other locations are in the light absorbing state. Thereafter a beam of light may be passed through the page composer and focused onto a storage medium. In one form of the invention, the beam is a coherent light beam obtained from a laser. Concurrently a second coherent light beam known as a reference beam is shined onto the same location of the storage medium at an angle with the so-called object beam from the page composer to form a hologram on the storage medium. This hologram may be developed and fixed and subsequently read out in conventional fashion. During readout, for example, the hologram images may be reconstructed over an array of light sensing devices for translating the optically stored bits to electrical signals.

An important feature of the page composer of FIG. 12 is that its information content can be electronically changed. The old information can be erased by applying to each location a pulse such as shown in FIG. 13*c*. This pulse causes the trapped charge to be swept toward the anode at each memory location and, for the reasons already discussed, when in this condition, each device contains no trapped charge and therefore attenuates light. The new information again may be written into the memory by selectively applying to certain of the locations the pulse shown in FIG. 13*b* to place these locations in their light transmitting condition.

What is claimed is:

1. In combination:

an insulating layer comprising polystyrene;

means for introducing a plasma into said insulating layer for creating in the forbidden energy gap of the insulating layer an induced band of allowable energy states;

means for inducing and trapping in said insulating layer having said plasma therein an electronically controllable charge;

means for shining a beam of light through said insulating layer;

means for modulating said light comprising means for varying the amount of said charge; and a light detector for sensing the amount of light passing through said layer.

2. In combination:

an insulating layer;

means for introducing a plasma into said insulating layer for creating in the forbidden energy gap of the insulating layer an induced band of allowable energy states;

means for inducing and trapping in said insulating layer having said plasma therein an electronically controllable charge, comprising a metal layer on one surface of the insulating layer, said metal layer serving as a cathode, a metal layer on the other surface of said insulating layer and serving as an anode, and means for applying a voltage pulse between said two metal layers, which voltage pulse is of a sense to cause electrons to flow from said cathode, said voltage pulse having an amplitude greater than that necessary to cause maximum current flow through said insulator and having a relatively steep lagging edge;

means for shining a beam of light through said insulating layer;

means for modulating said light comprising means for varying the amount of said charge; and a light detector for sensing the amount of light passing through said layer.

3. A light modulator comprising, in combination:

a relatively hard, amorphous, sponge like, organic insulator layer;

two metal layers, one on each surface of the insulator, the two metals having substantially different oxidation potentials; and means for applying a direct voltage in the forward direction between the two metal layers for a time sufficient to cause metal ions to migrate from one metal layer into the insulating layer and electrons to migrate from the other metal layer into the insulating layer, to thereby cause a plasma to be trapped in the insulator layer.

* * * * *

UNITED STATES PATENT OFFICE
CERTIFICATE OF CORRECTION

Patent No. 3,772,612 Dated November 13, 1973

Inventor(s) Robert Allen Gange

It is certified that error appears in the above-identified patent and that said Letters Patent are hereby corrected as shown below:

Column 5, line 57, that portion of the right-hand side of the equation reading

"$\{-\Omega V_o\}$" should read --$\{-\Omega V_o^{1/2}\}$--, and that portion of the right-hand side of the equation reading "$(V/V_o)$" should read --$(V/V_o^{1/2})$--.

Column 6, line 7, that portion of the right-hand side of the equation reading

"$\sin h \left\{ \frac{\Phi \Delta V}{4\delta (V_o + V - \Phi_i)^{1/2}} \right\}$" should read --$\sinh \left\{ \frac{\Omega \Delta V}{4\delta (V_o + V - \Phi_i)^{1/2}} \right\}$--.

Signed and sealed this 23rd day of April 1974.

(SEAL)
Attest:

EDWARD M. FLETCHER, JR.
Attesting Officer

C. MARSHALL DANN
Commissioner of Patents